United States Patent [19]

Larsson et al.

[11] Patent Number: 4,600,735

[45] Date of Patent: Jul. 15, 1986

[54] SOIL-REPELLENT COATING COMPOSITION

[75] Inventors: Bernt Larsson, Hisings Backa; Gunilla Nobelius, Kungalv; Elisabet Johansson, Goteborg, all of Sweden

[73] Assignee: EKA AB, Surte, Sweden

[21] Appl. No.: 701,928

[22] Filed: Feb. 15, 1985

[30] Foreign Application Priority Data

Feb. 17, 1984 [SE] Sweden ................ 8400864

[51] Int. Cl.$^4$ .......................... C08K 3/36; C08K 5/06; C08K 9/04; D06M 11/06
[52] U.S. Cl. .................................. 523/216; 524/377; 524/493; 524/503
[58] Field of Search ............... 523/216; 524/493, 503, 524/377

[56] References Cited

U.S. PATENT DOCUMENTS

| | | | |
|---|---|---|---|
| 3,594,113 | 7/1971 | Lifland et al. | 8/186 |
| 3,652,379 | 3/1972 | White | 428/446 |
| 3,738,957 | 8/1973 | Iler | 524/547 |
| 4,016,129 | 4/1977 | Miyosawa | 428/446 |
| 4,069,176 | 1/1978 | Tsubakimoto et al. | 524/493 |
| 4,383,057 | 5/1983 | Yamamoto et al. | 524/493 |
| 4,478,909 | 10/1984 | Taniguchi et al. | 428/429 |

FOREIGN PATENT DOCUMENTS 0140367  2/1980  German Democratic Rep. .
0106969  8/1981  Japan .

OTHER PUBLICATIONS

Derwent's Abstract, 38682B/20, SU 615-158.

Primary Examiner—Herbert J. Lilling
Attorney, Agent, or Firm—Luedeka & Neely

[57] ABSTRACT

A soil-repellent coating composition comprising silica, polyvinyl alcohol and a wetting agent in an aqueous carrier medium. The composition is characterized in that it, in addition to the aqueous carrier medium, contains 0.5–30% by weight of silica and 0.01–6% by weight of polyvinyl alcohol, and 0.05–2.5% by weight of a wetting agent, based on the total weight of the composition. The ready-made coating composition comprises 0.05–5% by weight of silica, 0.05–0.5% by weight of polyvinyl alcohol and 0.05–0.5% by weight of the wetting agent. The silica is present in the form of an alkali stabilized, preferably ammonium stabilized silica sol with an average particle size of 4–30 nm. The polyvinyl alcohol preferably has a hydrolysis degree of 85–100% and an average molecular weight of 15,000–100,000. The weight ratio of silica to polyvinyl alcohol is above 3:1 and preferably from 5:1 to 40:1. The wetting agent preferably is nonionic. The aqueous carrier medium of the composition may comprise a water-miscible, low-boiling solvent such as ethanol in an amount of up to 20% by weight.

10 Claims, No Drawings

SOIL-REPELLENT COATING COMPOSITION

The present invention relates to a so-called antisoil composition, i.e. a soil-repellent coating composition, of the type defined in the preamble of claim 1.

It is previously known that the soil resistance of surfaces and substrates can be increased by different kinds of surface treatments, i.e. that it is possible to make them more soil-repellent than they are originally. Such a treatment is also called anti-soil treatment, and the compositions used are called anti-soil compositions.

A known type of such soil-repellent compositions are organic polymeric compositions containing perfluorinated polymers. Such compositions can be used for improving the soil-repellent properties of various surfaces and materials, such as plastic, metal, textiles for clothes and furniture, carpets etc.

According to DD patent specification No. 140,367, floor coverings are treated with an aqueous colloidal silicic acid solution to provide for better cleaning of the floor covering and reduce resoiling.

In optical contexts, EPC patent specification No. 81304987.1, Publication No. 0051405, suggests an antifogging film that has been produced by curing polyvinyl alcohol, finely divided silica and an organic silicon compound (silane). The organic silicon compound is a necessary component of the composition which, besides, is distinguished by a large content of polyvinyl alcohol. It is not shown that the composition has a soil-repellent effect.

EPC patent application 81304869.1, Publication No. 0052427, discloses a coating composition similar to the above-mentioned one and comprising (a) colloidal silica having a particle size in the range 7 to 50 nm, (b) colloidal silica having a large particle size in the range 75 to 150 nm, (c) a polymeric binder which may comprise polyvinyl alcohol but preferably comprises copolymers of vinyl monochloroacetate and 30 to 60 mole % of vinyl acetate and/or vinyl alcohol, and (d) a volatile liquid medium, such as methanol, ethanol, acetone or the like. The mixture of fine and coarse silica particles in the composition, the coarse particles protruding from the coating surface, is said to be effective to improve the anti-fogging properties of the treated surface.

No. DE-OS-2,534,103 describes a curable coating composition obtained by heating colloidal silica and polyvinyl alcohol to at least 50° C. to form a complex, preferably in the presence of a reaction accelerator in the form of a di- or trialkoxy silane.

Of the above-mentioned patent specifications, only DD Pat. No. 140,367 relates to soil-repellent coating compositions. The advantage of such silica-based compositions is that they have excellent soil-repellent properties which are obtained in a more economic manner than the comparatively expensive compositions which are based on organic perfluorinated polymers. A drawback of such soil-repellent coatings, which are based on silica only, is that the coating has unsatisfactory wear resistance.

The object of the present invention is therefore to provide a soil-repellent, silica-based coating composition with improved properties, especially with respect to wear resistance.

According to the invention, this is achieved in that silica is combined with a binder comprising polyvinyl alcohol, and a wetting agent while, furthermore, certain critical conditions regarding the components of the composition and their contents must be observed.

The characteristic features of the invention are defined by the appended claims.

The main components of the coating composition according to the invention are (a) colloidal silica, (b) polyvinyl alcohol, (c) a wetting agent, and optional additives, such as water-miscible, low-boiling solvents. These components of the composition according to the invention will be described in detail below.

(a) Colloidal silica

The colloidal silica is present in the composition in the form of a silica sol, more precisely an alkali stabilised silica sol. The average particle size of the colloidal silica particles is 4–30 nm. With a particle size less than 4 nm, the stability of the composition is deteriorated, whereas a particle size of more than 30 nm tends to provide an opaque coating. Preferably, the colloidal silica has an average particle size of 5–20 nm.

An alkali stabilised silica sol implies in the present context a silica sol which is stabilised to coagulation by means of alkali metal ions, such as sodium or potassium ions, or by means of ammonium ions. Stabilising by ammonium ions is obtained by substituting completely or partly, by means of ion exchange, ammonium ions for the alkali metal ions of the sol (for example sodium ions).

Preferably, the silica sol weight ratio of $SiO_2$ to $M_2O$ is from 20:1 to 300:1, M comprising at least one of the monovalent cations $K^+$, $Na^+$ and $NH_4^+$, preferably $NH_4^+$.

In the present invention, it is especially preferred to use silica sols which are at least partly, but preferably completely, ammonium ion-stabilised. The reason is that polyvinyl alcohol, which is used as a specific binder in the present invention, is inactive to silica sol at high pH values but reacts with the sol at low pH values. By using volatile ammonia as a pH increasing and stabilising agent for the sol, a coating composition of silica sol and polyvinyl alcohol is obtained which normally is stable in storage but which, on application to a substrate and subsequent heating, undergoes a transformation and is made insoluble in that volatile ammonia leaves the coating composition, whereby its pH is reduced and the polyvinyl alcohol reacts with the silica under formation of hydrogen bonds. Although from the beginning, the two components are water-borne, this destabilisation with removal of ammonia produces an electrolyte-free polymer complex which is highly water-insoluble and binds firmly to the substrate.

In anti-fouling applications where the coating stays submerged for very long periods, modified silica sols may be suitable. Silica sols can be modified on the surface with aluminum by adding sodium aluminate. By the aluminum modification, the particles become negatively charged also at low pH values. Aluminum modified sols, when dried to thin layers, are less sensitive to water than unmodified sols because the silicate solubility decreases in the presence of aluminum.

The silica concentration of the silica sol, based on the total weight of the composition, depends on whether the concentrated storage composition or the ready-made coating composition is involved. Generally, the silica content is 0.5–30% by weight, the concentrated storage composition preferably having a silica content of 10–30% by weight, and the ready-made coating composition having a silica content of 0.5–5% by weight. Of course, the silica content of the storage composition is not limited downward to 10% by weight, but may also be lower than 10% by weight and down to about 0.5% by weight, with the only condition that it shall be possible to prepare from the storage composition a ready-made composition having a silica content of 0.5–5% by weight. If the silica content of the storage composition is in the range 0.5–5% by weight, it thus corresponds to the ready-made coating composition.

With a silica concentration of more than 30% by weight, the stability of the composition becomes unsatisfactory, especially with a small silica particle size. With a silica content of less than 0.5% by weight of the composition, no noticeable soil-repellent effect of the treated surface is obtained, whereas a silica content of more than about 5% by weight of the coating composition implies an unsatisfactory uneven coating. The silica content of the ready-made coating composition is therefore 0.5–5% by weight of the total weight of the composition, preferably 1–5% by weight, and if possible 2–3% by weight.

(b) Polyvinyl alcohol

Polyvinyl alcohol is used as a binder in the invention since it can, at low pH values, form hydrogen bonds with the silica particles and, simultaneously, it binds strongly to the substrate being treated. The polyvinyl alcohol used in the invention has a hydrolysis degree of 85–100%, preferably about 90–100%. In general, better results are achieved the higher the hydrolysis degree. When using a polyvinyl alcohol with a hydrolysis degree below 85%, it is difficult to obtain water-resistant coatings.

The average molecular weight of the polyvinyl alcohol is, in the invention, generally in the range of about 15,000–100,000. If the average molecular weight of the polyvinyl alcohol is lower than about 15,000, the water resistance of the coating tends to be unsatisfactory, while, if the average molecular weight of the polyvinyl alcohol exceeds about 100,000, the viscosity of the composition becomes too high in the storage solution.

The molecular weight is often defined as viscosity in centipoise at 20° C. of a 4% aqueous solution. The viscosity varies between 3 and about 70.

The polyvinyl alcohol concentration of the composition is related to the silica concentration, and more precisely the weight ratio of silica to polyvinyl alcohol in the composition according to the invention must exceed 3:1, and preferably the ratio is 5:1 to 40:1. At weight ratios 3:1 and lower, the soil-repellent properties and also the wear resistance become unsatisfactory, whereas weight ratios above 40:1 imply an unsatisfactory film forming and cracking of the film.

The most suitable ratio of silica to polyvinyl alcohol is also determined by the particle size of the silica sol. Thus, the best ratio is 4:1 to 20:1 for a sol with a particle diameter of 5 nm, while the best ratio is 10:1 to 30:1 for a sol with a particle diameter of 20 nm.

This means that the polyvinyl alcohol content of the composition according to the invention is, in general, about 0.01–6% by weight of the total weight of the composition, and preferably about 1.0–6.0% by weight for a storage composition having 10–30% by weight of silica, and, respectively, about 0.01–1% by weight for a ready-made coating composition having 0.5–5% by weight of silica. In a ready-made composition having a silica content of about 2.0–2.5% by weight, the polyvinyl alcohol is preferred to be about 0.05–0.5% by weight, preferably about 0.2% by weight.

(c) Wetting agent

It is necessary to include a wetting agent in the composition according to the invention to form even and homogeneous surface coatings with a preferred maximum thickness of about 1 $\mu$m.

The wetting agent can be either nonionic or anionic. Mostly, a nonionic wetting agent is preferred, while an anionic wetting agent contributes to foaming and may be suitable for example when treating carpets (foam application).

Nonionic as well as anionic wetting agents are well known in the art and therefore need not be described or enumerated. It may be mentioned, however, that among nonionic wetting agents those of the type aliphatic polyethylene glycol ethers are preferred.

The wetting agent amount is adapted to the substrate such that the surface tension of the solution is low enough to wet the substrate.

The wetting agent content is based, like the silica and the polyvinyl alcohol, on the weight of the total composition.

In a storage composition having a silica content of 10–30% by weight, the wetting agent content according to the present invention is about 0.25–2.5% by weight of the total composition.

In the ready-made coating composition having a silica content of about 0.5–5% by weight, the wetting agent content is about 0.05–0.5% by weight, preferably about 0.05–0.1% by weight. It must be observed that the wetting agent content should be kept as low as possible to avoid deterioration of the soil-repellent properties of the composition, since the wetting agent tends to be adsorbed to the silica particles and block the silanol groups thereof.

In addition to the above described main components of the composition according to the invention, also optional additives may be added, as already mentioned.

One such additive are water-miscible low-boiling solvents which are incorporated in the aqueous carrier medium to facilitate its evaporation and to contribute to an enhanced wetting of the treated substrate. The expression water-miscible low-boiling solvents relates in general to liquids which are completely miscible with water and act as solvents for the polyvinyl alcohol and the wetting agent and have a boiling point lower than that of the water. The water-miscible low-boiling solvent may be included in the aqueous carrier medium in a content of up to 20% by weight, preferably up to 10% by weight of the total composition. Suitable water-miscible low-boiling solvents are, for example, lower alcohols and ketones such as methanol, ethanol and acetone. Further examples are obvious to the expert and therefore an enumeration thereof is unnecessary.

As indicated previously, the composition according to the invention is, preferably, commercially available in the form of a concentrated storage composition which prior to use is diluted with water to a ready-made coating composition.

The ready-made coating composition is applied to the surface or the substrate to be treated in some suitable manner, such as by brushing, roller coating, dipping, slit application, spraying, foam coating etc.

The thickness of the coating applied should be small, and the thickness of the final dry coating film must not exceed 1 $\mu$m. As the lower limit for the thickness of the coating film, a monolayer of silica particle on the surface to be treated, or about 0.01 μm, may be indicated.

Substrates which can be provided with the soil-repellent coating according to the composition are, for example, metals such as steel, plastics such as polyvinyl chloride, polyethylene, polymethyl methacrylate, painted surfaces like alkyd paint, textiles such as fabrics for clothes and furniture, carpets etc. These are only examples of materials which can be provided with a soil-repellent coating of the composition according to the invention.

Due to the excellent water resistance of the coating, it may also advantageously be used as anti-fouling or anti-precipitating surface treatment under water, so-called anti-fouling treatment. Such utilisations are, for example, resin precipitation preventing treatment of polyester wires for the paper industry or the coating of heat exchanger surfaces to prevent precipitation of resins or milk proteins etc.

Some Examples are given below to further illustrate the invention without restricting it. In these examples, the soil-repellent coatings obtained were tested in different ways and the testing methods used are first briefly described.

1. Determining the anti-soil effect of the layer

Sheets of for example PVC having an anti-soil layer are covered with pulverised carbon and then as much as possible of the pulverised carbon is removed by shaking the sheet.

Brightness measuring is made before (0 test) and after coating with pulverised carbon, i.e. the self-reflectance of the coated PVC sheet is measured by white light, $\lambda=457$ nm, against a white background.

The difference in brightness (in the examples called $\Delta L1$) obtained is stated as a measure of the anti-soil effect. $\Delta L1$ may have values between 0 and 100. The lower the value, the higher the anti-soil effect.
Apparatus:
Zeiss Elrepho
Filter R457

2. Determining the dry wear resistance of the layer

A glass tube having a diameter of 50 mm and, in the bottom, a gap with a length of 20 mm and a width of 1.5 mm, was filled with 1 dm$^3$ of sand which was then allowed to flow out through the bottom gap and hit the sample (5 cm×8 cm) provided with the coating and arranged such that the vertical distance from the gap to the sample was 65 mm, and the angle of the sample to the horizontal plane was about 30°. The sand flows out in about 100 s. The remaining sand was rinsed with cold water from the sheet and the sheet was dried. The pulverised carbon test was then made exactly as described in "Determining the anti-soil effect of the layer".

In the Examples, the wear is defined as $\Delta L2 - \Delta L1$ (may have values between 0 and 100). The smaller this difference, the better the resistance of the layer. Pulverised carbon (active carbon) is used as a model substance in the soiling tests, since it can represent airborne soil (for example soot) and greasy soil, and also since it gives a measurable difference in brightness.

3. Longterm test in water

Test sheets having the dimensions 5 cm×8 cm were attached along the edge of a Petri dish filled with water and having a diameter of 22 cm, and then the water was stirred at 100 r/min with a stirrer during 2-3 days. After that, the samples were removed and the coating was inspected visually.

4. Testing silanol groups

After testing according to 1-3 above, the test sheets were tested for remaining silica with reagent for silanol groups. Remaining silica gives a blue colouring.

EXAMPLE 1

This Example shows a composition according to the invention and the method used for applying the coating in connection with the anti-soil and dry wear tests.

An ammonium stabilised silica sol (particle diameter 5 nm), a polyvinyl alcohol solution (5% aqueous solution of a polyvinyl alcohol which is sold under the name of Mowiol 4-98 by Hoechst. In the name Mowiol 4-98, 4 designates the viscosity in cP and 98 the hydrolysis degree) and a nonionic wetting agent (for example Berol 09 by Berol Kemi AB) are mixed such that the silica concentration is 2% by weight, the polyvinyl alcohol concentration 0.2% by weight and the wetting agent concentration 0.1% by weight.

The composition thus obtained is applied to sheets of various materials (PVC, polyethylene, polypropylene, polymethyl methacrylate, glass, stainless steel etc) with a slit applicator such that the thickness of the layer is 20 μm. The dry layer is then about 0.2 μm.

EXAMPLE 2

This Example illustrates how the properties of a coating with silica sol on a solid surface are affected by an admixture of polyvinyl alcohol (PVOH).

To a 2.5% by weight silica sol which has a particle diameter of 5.5 nm, is stabilised with ammonia (the ratio of SiO$_2$ to (NH$_4$)$_2$O = 40) and comprises 0.1% by weight of a wetting agent (Berol 09), polyvinyl alcohol is added such that the weight ratio of SiO$_2$ to PVOH varies according to Table 1. The polyvinyl alcohol was the same as in Example 1, i.e. Mowiol 4-98 dissolved in distilled water to a 5% by weight solution. The solutions were applied to hard transparent PVC sheets by means of a slit applicator to a wet layer thickness of 20 μm, which corresponds to a dry layer thickness of about 0.2 μm.

The properties with respect to the anti-soil effect, dry wear resistance and appearance were determined with the previously described methods and appear from Table 1.

TABLE 1

| Sample No. | Weight ratio SiO$_2$/PVOH | Anti-soil effect $\Delta L1$ | Dry wear $\Delta L2 - \Delta L1$ | Appearance |
| --- | --- | --- | --- | --- |
| 1 | 0.5 | 25 | 50 | Even film |
| 2 | 2 | 20 | 41 | Even film |
| 3 | 5 | 9 | 23 | Even film |
| 4 | 10 | 10 | 14 | Even film |
| 5 | 20 | 15 | 15 | Even film |
| 6 | 40 | 20 | 25 | Slightly cracked |
| 7 | ∞ | 20 | 40 | Completely cracked film, does not adhere |

Table 1 shows that it is not possible to obtain an even film with silica only, and that polyvinyl alcohol must be added, that the anti-soil properties are gradually deteriorated the lower the SiO$_2$ to PVOH ratio, and that the dry wear resistance seems to be optimal at a $SiO_2$ to PVOH ratio of 10–20:1.

EXAMPLE 3

This Example shows the film thickness effect on the coating properties and the appearance of a coating according to the invention applied to rigid PVC.

Coating compositions with a $SiO_2$ to PVOH ratio of 10:1 between ammonium stabilised silica sol and polyvinyl alcohol according to Example 1 were prepared with different total dry solids contents. In all compositions, a wetting agent of the type Berol 048 was added in an amount corresponding to 0.075% by weight of the total solution. The application was made like in Example 1. The results are shown in Table 2.

TABLE 2

| Dry solids content of coating composition (% by weight) | Thickness of dried film (μm) | Dry wear ΔL2 - ΔL1 | Appearance |
|---|---|---|---|
| 2.4 | 0.2 | 14 | Even film |
| 4.8 | 0.4 | 14 | Even film |
| 7.2 | 0.6 | 25 | Slightly cracked film |

Table 2 shows that films with a thickness of more than about 0.5 μm are not even and free of cracks and do not have good dry wear properties.

EXAMPLE 4

This Example shows how the silica sol particle size affects the appearance and properties of the film applied.

Coating compositions of ammonium stabilised silica sols with varying particle diameters (determined by transmission electron microscope) and polyvinyl alcohol of the type Mowiol 20-98 (where 20 designates the viscosity in cP and 98 the hydrolysis degree) were mixed to different ratios as shown in Table 3. All compositions had a total dry solids content of 2.0% by weight. A wetting agent (Berol 048) was added to all compositions in an amount of 0.075% by weight. The compositions were applied to plexiglass sheets with a slit applicator. The thickness of the dried film was about 0.2 μm.

The results are shown in Table 3.

TABLE 3

| $SiO_2$ particle diameter (nm) | Weight ratio $SiO_2$/PVOH | Anti-soil ΔL1 | Dry wear resistance ΔL2 - ΔL1 | Appearance |
|---|---|---|---|---|
| 5 | 10 | 14 | 15 | Even |
|  | 20 | 8 | 20 | transparent films |
|  | 40 | 6 | 30 | |
| 12 | 10 | 9 | 12 | Even |
|  | 20 | 10 | 10 | transparent films |
|  | 40 | 7 | 20 | |
| 20 | 10 | 20 | 8 | Even |
|  | 20 | 10 | 7 | transparent films |
|  | 40 | 8 | 15 | |
| 35 | 10 | 30 | 20 | Even but slightly opaque films |
|  | 20 | 20 | 15 | |
|  | 40 | 10 | 10 | |

Table 3 shows that the silica sol particle size affects the appearance, anti-soil effect and dry wear resistance of the films. In principle, all silica sols in the Example give good properties at the $SiO_2$ to PVOH ratio indicated. However, an opaque film is obtained if the silica sol particle diameter is 35 nm.

It is interesting to see that, to obtain simultaneously both a high anti-soil effect and dry wear resistance, the weight ratio of $SiO_2$ to PVOH must be adjusted upwards with an increasing particle size.

EXAMPLE 5

This Example shows how the counter ion of the silica sol affects the coating film properties.

A silica sol with a particle diameter of 5 nm and with a counter ion as shown in Table 4 was mixed with polyvinyl alcohol and a wetting agent according to Example 1 to a total dry solids content of 2% by weight and was applied, as indicated in Example 1, to PVC sheets to a dry film thickness of 0.2 μm. The film was dried at 25° C. as well as at 60° C.

TABLE 4

| Counter ion | pH | Appearance of the solution | Drying temperature (°C.) | Anti-soil effect [ΔL1] | Wear [ΔL2-ΔL1] | Film properties, appearance |
|---|---|---|---|---|---|---|
|  | 2 | All solid material precipitates |  |  |  |  |
| $Na^+$ | 8 | Homogeneous clear solution | 25 | 25 | 4 | Even dull film |
| $Na^+$ | 8 | Homogeneous clear solution | 60 | 20 | 10 | Even dull film |
| $NH_4^+$ | 8 | Homogeneous clear solution | 25 | 9 | 14 | Even bright film |
| $NH_4^+$ | 8 | Homogeneous clear solution | 60 | 8 | 2 | Even bright film |

EXAMPLE 6

This Example shows the effect of the wetting agent type and quantity on the properties of the coating. It also shows that ethanol can be admixed to the composition without deterioration of the properties of the coating.

The composition contains 2% by weight of silica from an ammonia stabilised silica sol (particle diameter 5 nm) and polyvinyl alcohol (Mowiol 4-98) such that the ratio of $SiO_2$ to PVOH=10:1. To this composition, the wetting agent according to Table 5 was added. To certain compositions, ethanol was added such that the ethanol content was 10% by weight. Application in accordance with Example 1 to sheets of PVC, polypropylene and glass gave coating films with a thickness of about 0.2 μm and with the properties indicated in Table 5.

TABLE 5

THE EFFECT OF THE WETTING AGENT ON THE APPEARANCE AND ANTI-SOIL PROPERTIES OF THE COATING

| Sample No. | Wetting agent Type | Conc. % | Ethanol content % | Result of film formation Glass | Polypropylene | PVC | Anti-soil properties PVC [ΔL1] |
|---|---|---|---|---|---|---|---|
| 1 | Berol 048 (non-ionic) | 0.075 | 10 | + | + | + | 4 |
| 2 | Berol 048 (non-ionic) | 0.075 | 0 | + | + | + | 4 |
| 3 | Berol 048 (non-ionic) | 0.15 | 10 | ++ | ++ | ++ | 9 |
| 4 | Berol 048 (non-ionic) | 0.15 | 0 | ++ | ++ | ++ | 9 |
| 5 | Berol 048 (non-ionic) | 0.40 | 10 | +++ | +++ | +++ | 12 |
| 6 | Berol 048 (non-ionic) | 0.40 | 0 | +++ | +++ | +++ | 13 |
| 7 | Berol 474 (an-ionic) | 0.075 | 10 | − | − | − | 7 |
| 8 | Berol 474 (an-ionic) | 0.075 | 0 | − | − | − | 8 |
| 9 | Berol 474 (an-ionic) | 0.15 | 10 | − − | − − | − − | 10 |
| 10 | Berol 474 (an-ionic) | 0.15 | 0 | − − | − | − − | 11 |
| 11 | Berol 474 (an-ionic) | 0.40 | 10 | − − − | − − − | − − − | 15 |
| 12 | Berol 474 (an-ionic) | 0.40 | 0 | − − − | − − − | − − − | 14 |
| 13 | Berol 474 (an-ionic) | 0.05 | 10 | − | − | − | 8 |
| 14 | Berol 474 (an-ionic) | 0.05 | 0 | − | − − | − − | 7 |
| 15 | Berol 474 (an-ionic) | 0.025 | 10 | − + | − − − | − − − | 8 |
| 16 | Berol 474 (an-ionic) | 0.025 | 0 | − + | − − − | − − − | 8 |
| 17 | Berol 09 (non-ionic) | 0.05 | 0 | | | + − | 7 |
| 18 | Berol 09 (non-ionic) | 0.075 | 0 | | | + | 9 |
| 19 | Berol 09 (non-ionic) | 0.10 | | | | ++ | 13 |

Appraisal of film formation:

TABLE 5-continued

THE EFFECT OF THE WETTING AGENT ON THE APPEARANCE AND ANTI-SOIL PROPERTIES OF THE COATING

| Sample | Wetting agent | | Ethanol | Result of film formation | | | Anti-soil prop- |
|---|---|---|---|---|---|---|---|
| No. | Type | Conc. % | content % | Glass | Polypropylene | PVC | erties PVC [ΔL1] |

+     fairly good, acceptable  
++    good                     } even films, not cracked  
+++   very good  
−     poor, cracked film  
− −   poor, small flakes released from the substrate  
− − − very poor, large portions of the film released from the substrate Table 5 shows that the type of wetting agent is very important to the film formation. On the other hand, the type of wetting agent is not very important to the anti-soil properties. The amount of wetting agent is very important to the anti-soil properties. The higher the wetting agent content, the poorer the anti-soil properties. This has been discussed earlier in the description under the heading "(c) Wetting agent".

EXAMPLE 7

This Example shows how the molecular weight and hydrolysis degree of the polyvinyl alcohol affects the properties of the coating film.

Compositions with a total dry solids content ($SiO_2$+PVOH) of 2% by weight and with 0.075% by weight of a wetting agent (Berol 048) were prepared from different polyvinyl alcohol types and applied to coating films with a thickness in the dry state of 0.2 μm. Drying was carried out at room temperature. The anti-soil effect is shown in Table 6.

TABLE 6

| Sample No. | Sub-strate | PVOH desig-nation | Hydro-lysis degree (%) | Visco-sity in 4% so-lution (cP) | $SiO_2$/PVOH | Anti-soil effect (ΔL1) |
|---|---|---|---|---|---|---|
| 1 | Glass | 4–88 | 88 | 4 | 5 | 12 |
| 2 | " | " | " | " | 4 | 14 |
| 3 | " | " | " | " | 3 | 16 |
| 4 | " | " | " | " | 2 | 19 |
| 5 | " | 40–88 | " | 40 | 5 | 11 |
| 6 | " | " | " | " | 4 | 13 |
| 7 | " | " | " | " | 3 | 15 |
| 8 | " | " | " | " | 2 | 18 |
| 9 | " | 4–98 | 98 | 4 | 5 | 8 |
| 10 | " | " | " | " | 4 | 11 |
| 11 | " | " | " | " | 3 | 12 |
| 12 | " | " | " | " | 2 | 14 |
| 13 | " | 50–98 | " | 56 | 5 | 10 |
| 14 | " | " | " | " | 4 | 11 |
| 15 | " | " | " | " | 3 | 13 |
| 16 | " | " | " | " | 2 | 15 |
| 17 | " | — | — | — | ∞ | 7 |
| 18 | " | 4–98 | 98 | 4 | 0 | 25 |
| 19 | PVC | " | " | " | 10 | 5 |
| 20 | " | 4–88 | 88 | " | " | 12 |
| 21 | " | 4–98 | 98 | " | 20 | 9 |
| 22 | " | 4–88 | 88 | " | " | 10 |
| 23 | " | 4–98 | 98 | " | 2 | 8 |
| 24 | " | " | " | " | 5 | 10 |
| 25 | " | 56–98 | " | 56 | 2 | 9 |
| 26 | " | " | " | " | 5 | 8 |

Table 6 shows that polyvinyl alcohol with a hydrolysis degree of 98% gives better anti-soil properties than polyvinyl alcohol with a hydrolysis degree of 88%. Furthermore, it is shown that a low ratio of $SiO_2$ to PVOH, for example 2:1, gives a poorer result than a higher ratio of, for example, 5–20:1.

EXAMPLE 8

This Example shows the effect of different surface modifications of the silica sol on the properties of the coating film.

Surface modification of silica sol with a particle diameter of 6 nm was made according to previously known technique with sodium aluminate such that, also at a low pH value, a strongly negatively charged particle was obtained.

Compositions were prepared from different silica sol types as mentioned above and polyvinyl alcohol (Mowiol 4-98) at a $SiO_2$ to PVOH ratio of 5. The dry solids content of the compositions was 2%. The wetting agent admixture appears from Table 7. The coating compositions were applied to give a dry film thickness of 0.2 μm on polyethylene sheets according to Example 1. The film properties are shown in Table 7.

TABLE 7

| Silica sol type | Wetting agent type | Wetting agent quantity | Anti-soil ΔL1 | Wear ΔL2-ΔL1 | Film appearance |
|---|---|---|---|---|---|
| $Na^+$ sta-bilised, unmodified | Berol 09 | 0.1% | 25 | 15 | Even film dull |
| Aluminate modified | " | 0.1% | 29 | 20 | Even film dull |
| $NH_4^+$ sta-bilised | " | 0.1% | 10 | 10 | Even film bright |

EXAMPLE 9

This Example shows that concentrated coating compositions can be prepared. In respect of costs, it is advantageous to transport and store concentrated compositions. To lower the freezing point of the composition, up to 20% by weight of ethanol can be added without affecting the finished film. The concentrated compositions can be prepared from, for example, the following components:

(A) a 15% ammonium stabilised silica sol with a particle diameter of 6 nm, or (B) a 40% ammonium stabilised silica sol with a particle diameter of 12 nm, and (C) a 10% solution of polyvinyl alcohol (Mowiol 4-98), prepared by heating the polyvinyl alcohol grains in water during 1 hour at 90° C., or (D) a 5% solution of polyvinyl alcohol (Mowiol 56-98), prepared by dissolving the polyvinyl alcohol grains in water during 1 hour at 90° C.

Table 8 shows the storage stability of some concentrated compositions which were prepared from the abovementioned components. The weight ratio of $SiO_2$ to PVOH of the compositions was 10:1.

TABLE 8

| Sample No. | A (g) | B (g) | C (g) | D (g) | Wetting agent quantity (g) | Water (g) | Ethanol (g) | Total dry solids content (%) | Storage stability (months) |
| --- | --- | --- | --- | --- | --- | --- | --- | --- | --- |
| 1 | 53 | — | 8 | — | 0.3 | 18.7 | 20 | 9.1 | 11 |
| 2 | 53 | — | 8 | — | 0.3 | 38.7 | 0 | 9.1 | >12 |
| 3 | 67 | — | 10 | — | 0.375 | 22.6 | 0 | 11.4 | 8 |
| 4 | — | 50 | — | 40 | 0.75 | 8.25 | 0 | 23.75 | >12 |
| 5 | — | 50 | 20 | — | 0.75 | 28.25 | 0 | 23.75 | >12 |
| 6 | — | 50 | 20 | — | 0.75 | 8.25 | 20 | 23.75 | 10 |
| 7 | — | 70 | 28 | — | 1.05 | 0.95 | 0 | 31.9 | 5 |

The concentrated compositions may have a dry solids content of above 30% by weight at a particle size of 12 nm, but preferably the dry solids content is 5–30%. The weight ratio of $SiO_2$ to PVOH may vary between 5:1 and 40:1, i.e. in the same manner as previously diluted compositions.

Before being applied, the composition is diluted with water such that the dry solids content is 1.5–5% by weight. The concentrated compositions comprise such an amount of the wetting agent that the final wetting agent concentration is 0.05–0.5% by weight when diluting with water such that the silica concentration is 1.5–4% by weight. The properties of the finished coating film are not affected by the composition being originally concentrated.

EXAMPLE 10

This Example shows that the coating composition according to the invention can also be used as an antistatic agent.

A composition according to Example 1 was applied to give a thickness in the dry state of 0.2 μm on sheets of PVC, polyethylene and polymethyl methacrylate. Then the electric resistance of the coating was measured according to British Standard 2050:1978 A.4.1 Test on one surface. The results are shown in Table 9.

TABLE 9

| Test sheet | Resistance (Ω) |
| --- | --- |
| PVC with coating | $9.4 \cdot 10^9$ |
| PVC without coating | $77 \cdot 10^{12}$ |
| PE with coating | $67 \cdot 10^9$ |
| PE without coating | $33 \cdot 10^{12}$ |
| PMMA with coating | $60.5 \cdot 10^9$ |
| PMMA without coating | $20 \cdot 10^{12}$ |

Table 9 clearly shows that the composition according to the invention gives a coating with a very good antistatic effect on all tested substrates.

EXAMPLE 11

This Example shows how the composition according to Example 1 can be used as a soil-repellent agent on tufted carpets.

A tufted carpet was impregnated with a composition according to Example 1 such that the quantity applied was 12 g silica/m². Since the carpet fibres had an effective surface of 70 m²/m² carpet, the quantity applied corresponded to a layer thickness of 0.1 μm.

Soiling tests were made on the carpet in accordance with Swedish Standard SS832535, item 6.3, relating to heavy soiling. By measuring with a colour measurement device of the mark Hunterlab, the colour changing index (E) for the various Examples was followed during the soiling treatment. The results are shown in Table 10.

TABLE 10

| | E according to the number of g soil and work cycles (WC) | | | | | |
| --- | --- | --- | --- | --- | --- | --- |
| Test material | g 60 | WC 6000 | g 90 | WC 9000 | g 120 | AC 12000 |
| Reference test of Scotchgard ® treated carpet | 8.8 | | 10.7 | | 11.1 | |
| Scotchgard ® treated carpet | 7.8 | | 9.9 | | 10.6 | |
| Reference test of carpet treated with the composition according to the invention | 8.9 | | 10.5 | | 11.1 | |
| Carpet treated with the composition according to the invention | 4.3 | | 6.7 | | 8.6 | |

Table 10 shows tht treatment with the composition according to the invention gives a clearly soil-repellent effect, and that treatment with the composition according to the invention gives a hgiher soil-repellent effect than the corresponding treatment with Scotchgard ®.

EXAMPLE 12

This example shows that a layer of the composition according to the invention has an anti-precipitating effect also in liquids, i.e. an anti-fouling effect.

Chromium sheets were coated with a type and quantity of the coating composition in accordance with Example 1. Coated and uncoated sheets were subjected to immersion in a 1% solution of β-lacto globulin in water for 15 minutes at 50° C. Then the sheets were washed under running tap water and compared with respect to their appearance. The untreated sheets were dull from precipitated protein, whereas the sheets coated with the coating composition according to the invention were practically unaffected by the protein and still bright.

Thus, the Example shows that the coating composition according to the invention has an anti-fouling effect.

EXAMPLE 13

This Example shows how the hydrolysis degree of the polyvinyl alcohol affects the wear resistance of the coating film under water. In fouling contexts, it is important that the coating film is as waterproof as possible.

A mixture was made of a composition in accordance with Example 1, although with three different types of polyvinyl alcohol, i.e. Mowiol 4-88, 4-98 and 66-100, the first number, as before, designating the viscosity in cP, while the last number designates the hydrolysis degree. The compositions were applied to PVC sheets such that the thickness of the dry layer was 0.2 μm. The sheets were placed in a container with circulating water during 3 days.

By the silanol group test it was determined that the layer which contained polyvinyl alcohol of the type Mowiol 4-88 had disappeared almost completely (no blue colouring), whereas the other two layers were not affected (strong blue colouring).

What we claim and desire to secure by Letters Patent is:

1. A soil-repellent coating composition in an aqueous carrier medium comprising:
   (a) 0.5–30% by weight, based on the total weight of the composition, of silica in the form of an alkali stabilized silica sol having an average particle size 4–30 nm, (b) 0.01–6% by weight, based on the total weight of the composition, of polyvinyl alcohol, the weight ratio of silica to polyvinyl alcohol being higher than 3:1, and (c) 0.05–2.5% by weight of a wetting agent, selected from the class consisting of nonionic and anionic wetting agents, based on the total weight of the composition.

2. A composition according to claim 1 wherein it is a storage composition which is to be diluted before use and contains:

(a) 10–30% by weight of silica, (b) 1.0–6% by weight of polyvinyl alcohol, and (c) 0.25–2.5% by weight of a wetting agent.

3. A composition according to claim 1 wherein it is a ready-made composition containing:

(a) 0.5–5% by weight of silica, (b) 0.01–1.0% by weight of polyvinyl alcohol, and (c) 0.05–0.5% by weight of a wetting agent.

4. A composition according to claim 1 wherein the alkali stabilised silica sol is stabilised with $M^+OH^-$ such that the weight ratio of $SiO_2$ to $M^+$ as $M_2O$ is in the range of 20:1 I to 300:1, $M^+$ being selected from the class consisting of $K^+$, $Na^+$ and $NH_4^+$.

5. A composition according to claim 4 wherein the silica sol is stabilised with $NH_4OH$.

6. A composition according to claim 1 wherein the silica sol is surface modified with sodium aluminate.

7. A composition according to claim 1 wherein the weight ratio of silica to polyvinyl alcohol is in the range of 5:1 to 40:1.

8. A composition according to claim 3 wherein the silica concentration is 2–3% by weight.

9. A composition according to claim 1 wherein the polyvinyl alcohol has a hydrolysis degree of 85–100%.

10. A composition according to claim 3 wherein the aqueous carrier medium contains up to 20% by weight of a water-miscible, low-boiling, organic solvent.

* * * * *